Figure 5:
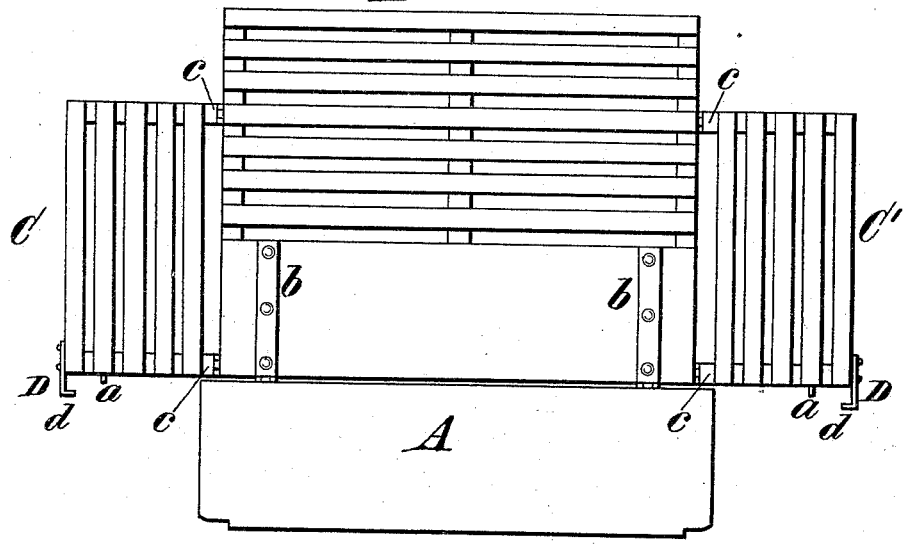

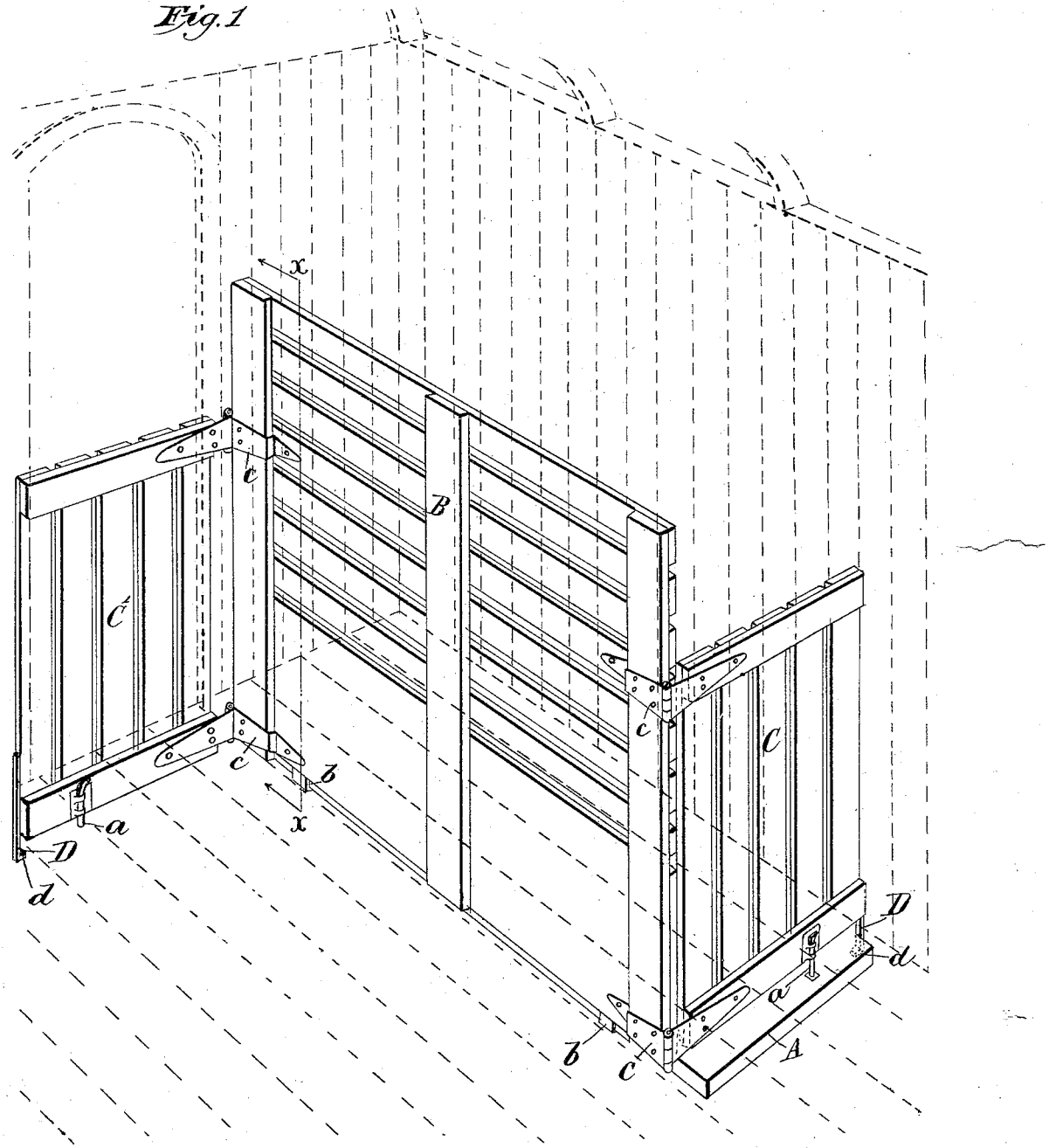

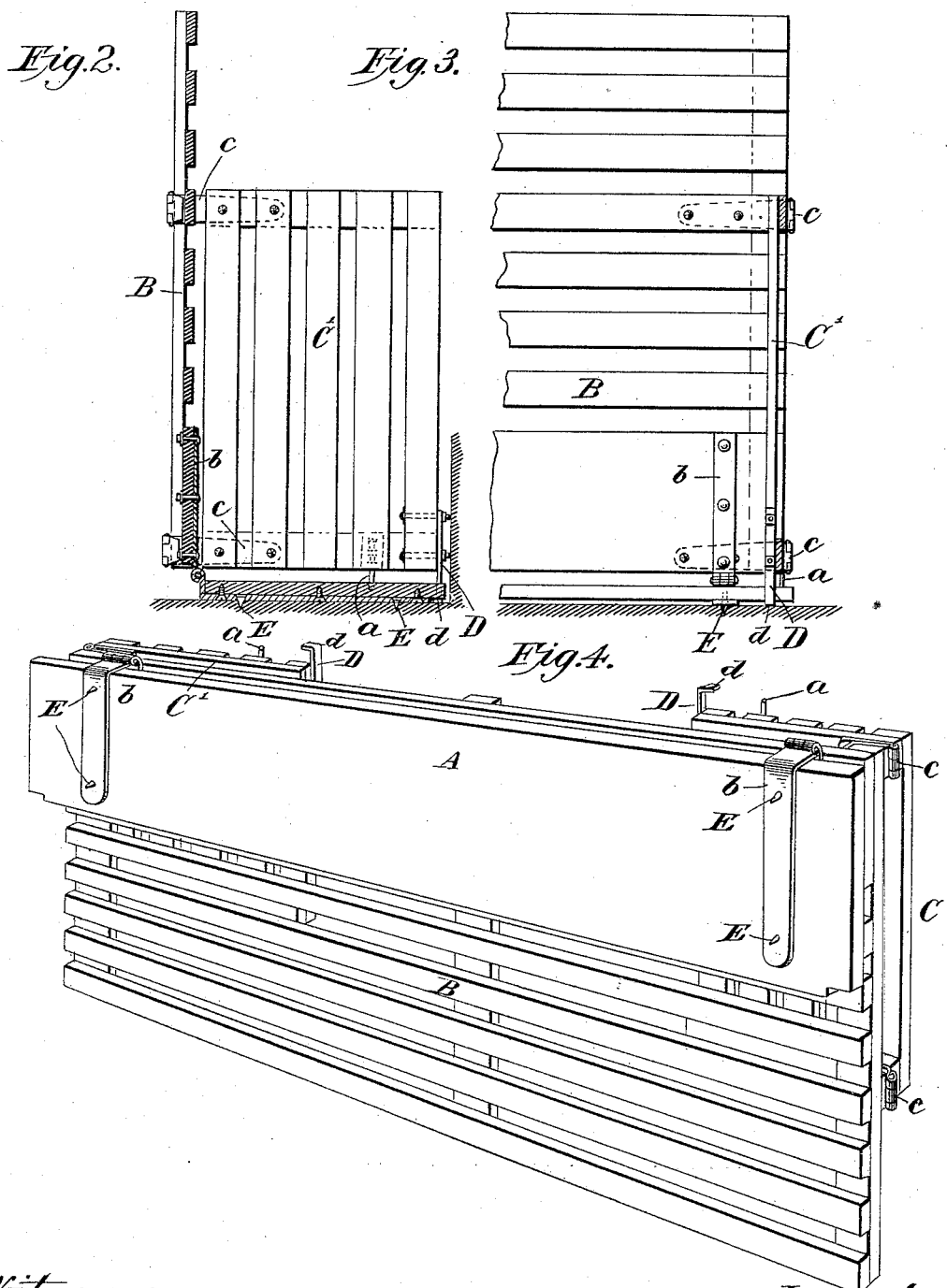

(No Model.) 3 Sheets—Sheet 3.

C. L. LOCKWOOD.
CAR STALL OR PEN FOR SHIPPING HORSES AND OTHER ANIMALS.

No. 431,024. Patented June 24, 1890.

Attest
Arthur J. Smith
Chas. E. Kissick

Inventor
Charles L. Lockwood,
by John E. Jones,
Attorney.

UNITED STATES PATENT OFFICE.

CHARLES L. LOCKWOOD, OF COVINGTON, KENTUCKY, ASSIGNOR TO HIMSELF, AND JOHN W. SHRAGUE, OF CINCINNATI, OHIO.

CAR STALL OR PEN FOR SHIPPING HORSES AND OTHER ANIMALS.

SPECIFICATION forming part of Letters Patent No. 431,024, dated June 24, 1890.

Application filed January 20, 1890. Serial No. 337,568. (No model.)

*To all whom it may concern:*

Be it known that I, CHARLES L. LOCKWOOD, a citizen of the United States, residing at Covington, in the county of Kenton and State of Kentucky, have invented a new and useful Portable and Folding Car Stall or Pen for Shipping Horses and other Animals, of which the following is a specification.

My invention relates to a portable and folding stall or pen for use in express or other railway cars or on boats in the shipment of horses and other animals from one point to another, all of which will be fully hereinafter described, and pointed out in the claims.

In the accompanying drawings, Figure 1 is a perspective view of my improvement, showing it in place in one corner of an express or other railway car ready for use; Fig. 2, a transverse sectional elevation on line $x$ $x$, Fig. 1, in the direction indicated by the arrows shown adjacent the opposite ends of said line, but with the rear door closed instead of open, as in said Fig. 1; Fig. 3, a broken inside elevation of one end of the stall, it being the same end shown in Fig. 2, with said rear door closed; Fig. 4, a perspective view of the parts forming the car-stall, shown folded up in the condition they assume when the stall is not in use; and Fig. 5 a plan view of the parts forming the stall, showing them spread out flat on the floor of the car, in which condition they are adapted to form a rack or grated platform for supporting freight, so that the drippings from any moist or wet freight—such as oysters, fish, and the like packed in ice—cannot injure or damage the other or adjacent dry freight.

A represents the base-board or platform proper of the stall; B, the upright grated side wall, hinged by means of hinges $b$ $b$ to one longitudinal edge of said base-board, and C C' grated gates or doors hung on hinges $c$ $c$ at the opposite ends of said side wall, all as clearly shown in Fig. 1.

$a$ $a$ are suitable bolts on the gates for locking them in the position they assume when the stall is in use.

D D are pendent bars secured to the outer lower corners of the gates and bent inwardly at right angles at their lower ends to form feet or stops $d$ $d$, which perform the functions I shall now explain. When the stall is in use, the foot-bars D $d$ on both gates serve to brace or support the side wall B against its being forced outwardly on its hinges or its accidental swinging or falling either inwardly or outwardly, the foot of the angular bar on the closed gate C engaging the lower corner or under side of base-board A, and the foot of the other angular bar on the open gate C' resting on the floor of the car, as shown in said Fig. 1. Those straps of the hinges $b$ $b$ which are secured to the bottom of the platform A are bent at right angles, so that they embrace both the corner and said bottom of the platform, and are provided with sharp points or spurs E, which project downwardly therefrom and sink or embed themselves into the substance of the car-floor when the weight of the animal is upon said platform, and form important auxiliaries, in connection with said weight of the animal, to hold the stall in place against slipping or shifting in any direction, owing to the movements or jars of the car. The points E are preferably made with a shouldered or beveled top and are inserted through countersunk openings or holes in the hinge-straps, as shown in Fig. 2, so that they may be removed at any time either for the purpose of sharpening or replacing them or omitting them altogether, as desired.

In the operation of my improvement it is by preference closely placed with one gate closed and the other lying open in one corner of the car, the end and side walls of said corner of the car thus practically forming two walls of the stall, all as shown in Fig. 1, the car-corner floor and usual doorway being shown in dotted lines in said Fig. 1. The gate C being opened, the animal (if a horse) is backed into the stall, so that his head lies in the direction of the express-messenger, or the open part or body of the car, and also so that he can be readily removed when desired, and then the gate is closed and bolted, the weight of said horse on the platform, together with the auxiliary points E, as hereinbefore stated, holding the stall firmly in place and preventing its accidental displacement. It is obvious that instead of placing the stall in the corner shown it could be set up in any other corner of the car, as both its gates are adapted to lie either open or closed at right angles to the side wall B, or it could be placed against one wall of the car with both gates closed, the weight of the animal and the angular bars D d firmly holding it in position and its said side wall upright. When the stall is not in use, it can be very readily folded up into small compass on its hinge joints or connections, as shown in Fig. 4, then tied with twine to prevent accidental opening and breaking, if desired, and set aside in a convenient and comparatively small space. It is thus adapted to be packed away in reduced bulk with others in a warehouse or elsewhere, and can be very readily taken in and out the car-door and also opened out and put in position for use at any time. The temporary shipping-stalls in general use in express and other railway cars are built therein about the same as they are in barns and stables, the sides being firmly nailed to the walls and floor of the car and put up piece by piece. Such stalls cannot be used to any material advantage subsequent to the removal of the animal at its destination, as they are immediately taken apart piecemeal or broken to pieces, as a rule, in the necessary haste to dislodge them. Considerable valuable time is thus consumed in building and dislodging such stalls, and great waste of material together with some damage to the car result. My stall being both a portable and folding one, no such difficulties, waste, inconveniences, and damage can evidently occur, and therefore I gain a great saving in time, labor, and material thereby. It is also obvious that the parts forming my stall can be utilized on the same, or on the return-trip of the car, after the delivery of the animal, by simply spreading them open on the car-floor, as clearly shown in Fig. 5, thus furnishing a grated rack or platform to receive all kinds of freight, both wet and dry, the dry being supported or elevated from the car-floor free from damage or injury should there be any drippings or leakage from adjacent wet freight—such as oysters, fish, and the like packed in ice—and permitting said drippings or leakage to fall or drain harmlessly between the gratings or open portions of the stall to said car-floor.

In the drawings I have shown the stall constructed with two gates, one being hinged at either end of the upright side wall B, which is the preferred form, for the reason that when one gate lies open and the other closed, as shown in Fig. 1, said side wall is best supported in an upright position thereby; but it is clearly obvious that, if desired, the stall could be constructed with a single gate adapted to be hung at one or the other end of said side wall by employing the ordinary separable hinges, and used to good advantage without departing from my invention herein. When but one gate is used, the stall is placed in one corner of the car with its open portion toward said corner, the two walls comprising the corner, thus completing the stall and serving in the capacity of both an end and side wall therefor.

I claim—

1. A portable car-stall composed of a platform or base, a single upright side wall, and a gate and means whereby it may be hinged to either end of said side wall, substantially as herein set forth, 2. A portable car-stall composed of the platform or base A, a single upright side wall B, hinged to one longitudinal edge of said platform, and gates C and C', hinged, respectively, to the opposite ends of said side wall, substantially as herein set forth.

3. A portable car-stall composed of the platform or base A, a single upright side wall B, hinged to one longitudinal edge of said platform, gates C C', hinged, respectively, at either end of said side wall, and points E on the bottom of said platform, the weight of the occupant of the stall, together with said points, serving to maintain said stall in position against shifting, substantially as herein set forth.

4. A portable car-stall composed of platform A, a single upright side wall B, hinged to one longitudinal edge of said platform, gates C C', hinged, respectively, at either end of said side wall, and pendent bars D, having inwardly-bent feet d and secured to the outer lower corners of said gates, substantially as herein set forth.

In testimony of which invention I have hereunto set my hand.

CHARLES L. LOCKWOOD.

Witnesses:
J. W. SHRAGUE,
JOHN E. JONES.